United States Patent
Briand et al.

(10) Patent No.: US 7,435,449 B2
(45) Date of Patent: Oct. 14, 2008

(54) WATERBORNE EPOXY COATING COMPOSITION AND METHOD

(75) Inventors: Remi Briand, Overland Park, KS (US); J. Alisa Duncan, Parkville, MO (US); Yves Floriot, Montreal (CA); Jennifer S. McGreal, Kansas City, MO (US)

(73) Assignee: Tnemec Company, Inc., Kansas City, MO (US)

( * ) Notice: Subject to any disclaimer, the term of this patent is extended or adjusted under 35 U.S.C. 154(b) by 77 days.

(21) Appl. No.: 11/018,644

(22) Filed: Dec. 20, 2004

(65) Prior Publication Data

US 2006/0135656 A1    Jun. 22, 2006

(51) Int. Cl.
- *B05D 3/00* (2006.01)
- *C08L 63/00* (2006.01)
- *B32B 27/20* (2006.01)
- *B32B 27/26* (2006.01)
- *B32B 27/38* (2006.01)

(52) U.S. Cl. .............. 427/386; 428/413; 523/401; 523/402

(58) Field of Classification Search ............ 428/413, 428/414, 415, 416, 417, 418; 523/400, 401, 523/402; 427/386
See application file for complete search history.

(56) References Cited

U.S. PATENT DOCUMENTS

| | | | |
|---|---|---|---|
| 3,196,122 A | 7/1965 | Evans | |
| 3,240,736 A | 3/1966 | Beckwith | |
| 3,316,187 A | 4/1967 | Grosner | |
| 3,578,548 A | 5/1971 | Wesp | |
| 3,822,229 A | 7/1974 | McMaster | |
| 3,859,239 A | 1/1975 | Van Gils | |
| 3,915,917 A | 10/1975 | Weiant | |
| 3,988,279 A * | 10/1976 | Klassen | 523/401 |
| 4,032,487 A | 6/1977 | Columbus | |
| 4,049,869 A | 9/1977 | DeLong | |
| 4,059,551 A | 11/1977 | Weiant | |
| 4,101,692 A * | 7/1978 | Lomasney et al. | 427/333 |
| 4,160,750 A | 7/1979 | Columbus | |
| 4,180,166 A * | 12/1979 | Batdorf | 206/568 |
| 4,215,179 A | 7/1980 | Melamed | |
| 4,221,697 A | 9/1980 | Osborn | |
| 4,222,981 A | 9/1980 | Caswell | |
| 4,342,843 A | 8/1982 | Perlinski | |
| 4,367,298 A | 1/1983 | Abbey | |
| 4,377,433 A | 3/1983 | Merz | |
| 4,392,335 A | 7/1983 | Heiman | |
| 4,421,797 A * | 12/1983 | Koehne | 427/403 |
| 4,427,804 A | 1/1984 | Tortorello | |
| 4,485,200 A | 11/1984 | Perlinski | |
| 4,510,274 A | 4/1985 | Okazaki | |
| 4,518,653 A | 5/1985 | McWilliams | |
| 4,522,962 A | 6/1985 | Abbey | |
| 4,524,107 A | 6/1985 | Marchetti | |
| 4,532,273 A | 7/1985 | Kadowaki | |
| 4,588,757 A | 5/1986 | Minnis | |
| 4,626,567 A | 12/1986 | Chang | |
| 5,017,632 A | 5/1991 | Bredow | |
| 5,037,885 A | 8/1991 | Mori | |
| 5,162,060 A | 11/1992 | Bredow | |
| 5,229,438 A * | 7/1993 | Ishida et al. | 523/428 |
| 5,252,636 A * | 10/1993 | Ellenberger et al. | 523/401 |
| 6,068,055 A * | 5/2000 | Chatterji et al. | 166/293 |
| 6,107,368 A * | 8/2000 | Roland et al. | 523/401 |
| 6,645,340 B2 * | 11/2003 | Gienau et al. | 156/330 |
| 2005/0065240 A1 * | 3/2005 | Kyte et al. | 523/218 |

FOREIGN PATENT DOCUMENTS

| | | |
|---|---|---|
| CA | 1043486 | 11/1978 |
| DE | 10150601 | 4/2003 |
| EP | 245012 | 11/1987 |
| EP | 0430276 | 6/1991 |
| EP | 0432921 | 6/1991 |
| FR | 2763937 | 12/1998 |
| GB | 2096633 | 10/1982 |
| JP | 59084915 | 5/1884 |
| JP | 53096942 | 8/1978 |
| JP | 58007467 | 1/1983 |
| JP | 08081253 | 3/1996 |

OTHER PUBLICATIONS

The Design of Reinforced Cement-Based Protective Coatings by Paul Bennison, Cortec Corporation, 4119 White Bear Parkway, St. Paul, MN 55110, May 10, 2005.
Rhoplex CL-C501 Acrylic Polymer Emulsion, Rohm & Haas Company, Philadelphia, PA, May 2005.
Elasto-Shield Series 406, Tnemec Company Incorporated, Kansas City, Missouri, Jul. 2003.
Elasto-Shield Series 400, Tnemec Company Incorporated, Kansas City, Missouri, Jul. 2003.

* cited by examiner

*Primary Examiner*—Michael J Feely
(74) *Attorney, Agent, or Firm*—Spencer Fane Britt & Browne LLP

(57) ABSTRACT

A waterborne coating composition comprising a waterborne epoxy coating with hydraulic cement, which is capable of a thin initial application. The coating composition may be made, stored and transported as a two-part composition, where each part is a pourable liquid. The waterborne epoxy composition cures under normal conditions and adheres to surfaces including masonry, concrete and metal.

43 Claims, No Drawings

WATERBORNE EPOXY COATING COMPOSITION AND METHOD

FIELD OF THE INVENTION

This invention relates to coating compositions and, more particularly, to waterborne epoxy coating compositions and methods for using such compositions.

BACKGROUND OF THE INVENTION

Epoxy coating compositions are used to treat surfaces to protect against corrosion and other forms of wear and tear caused by use and the environment. The types of surfaces treated include concrete, metal, and other surfaces. Effective coating compositions are prized not only for the quality of protection, but also for easy and efficient transportation, storage, and application. Thus, a good coating composition will not only protect the surface, but also be easy to apply and quick to cure.

The use of epoxy compositions containing volatile organic solvents has fallen out of favor even though these compositions provide exceptional anti-corrosion protection. The organic solvent based compositions are environmentally unfriendly and their use has been curtailed. Solvent free epoxy coatings often require sophisticated, non-standard equipment for application.

Other epoxy coating compositions provide good protection if applied at the recommended thickness. This recommended thickness requires multiple coats and each coat must be cured or set before another coat may be applied. Each additional coat requires additional labor, which increases the cost of application. Other coats may be applied at greater initial thickness, but require more time to set up. Coatings applied at greater initial thicknesses may also introduce flaws caused by voids from evaporation of volatile components during the curing process.

The combination of an epoxy resin and cement in a coating composition has been used previously to create cement compositions suitable for overlaying concrete. For example, prior products include cement based compositions with an epoxy used as "mortars," "toppings," or "overlays" to coat Portland cement concrete or metal surfaces. These compositions use a small portion of epoxy to enhance the cement composition and the final compositions are thick like cement and resembles cement. These are generally two-component compositions having a dry-mix component and a wet-mix component which are combined to form the final composition for application to surfaces in thick films, typically greater than about 20 mils. Other compositions have used an epoxy to bind a cement composition.

BRIEF SUMMARY OF THE INVENTION

There is, therefore, provided in the practice of the invention a novel waterborne fluid coating composition, which is epoxy based and includes hydraulic cement, for reduced initial thickness application, and which provides for a quicker application at a reduced cost. The waterborne epoxy coating composition broadly includes an epoxy resin, a hydraulic cement powder, a curing agent and water.

In one embodiment, the coating composition is prepared by mixing two pre-blended liquid components; one component containing a liquid epoxy resin and hydraulic cement powder; and the other component containing an amine-based curing agent and water. The first part may also include additives, such as a non-reactive diluent, a reactive diluent, an organo- silicon adhesion promoter, a pigment, hollow spheres, or other materials. The second part may also include additives, such as a cement plasticizer, a non-reactive diluent, a water-based latex resin, a defoamer, a corrosion inhibitor, or other materials.

Accordingly, it is an object of the present invention to provide an improved two-part waterborne epoxy coating providing anti-corrosion protection.

DETAILED DESCRIPTION

The waterborne epoxy composition broadly includes an epoxy resin, cement powder, an amine-based curing agent, and water. The composition may be enhanced with additives, including a non-reactive diluent, a reactive diluent, an organosilicon adhesion promoter, a pigment, hollow spheres, a cement plasticizer, a water-based latex resin, a defoamer, a corrosion inhibitor, or other materials Each element of the general formula will be discussed in detail below, followed by several embodiments of the composition and the method of production and application.

In various embodiments of the invention, the epoxy resin is present in the composition in an amount of about 8.0% to about 23.0% by weight, preferably about 10.0% to about 21.0% by weight, and more preferably about 11.0% to about 19.0% by weight.

The epoxy resin may be liquid, solid or semi-solid. The epoxy resin functions as the curable component of one part of the two-part epoxy coating composition. In one embodiment, the epoxy resin may consist of any one of bisphenol A, bisphenol F, epoxy phenol novolac, epoxy cresol novolac, naphthalene epoxy, or tertiary butyl cathecol epoxy. Another epoxy may be used besides those listed here, although these are preferred. In exemplary embodiments, the epoxy resin is a liquid bisphenol A epoxy resin, including for example, liquid bisphenol A epoxy resin such as Huntsman GY6010, or a water-dispersed bisphenol A epoxy resin such as Resolution EPI-REZ 3510-W-60.

In various embodiments of the invention, hydraulic cement powder is present in the composition in an amount of about 20.0% to about 72.0% by weight, preferably about 28.0% to about 71.0% by weight, and more preferably about 30.0% to about 70.0% by weight.

The hydraulic cement powder may be any type of Portland cement and may also be any color. Portland cement comes in Types I, II, III, IV, and V. The possible colors include white, grey, etc. In another embodiment, the hydraulic cement powder is a mixture of 0.50 to 0.95 weight parts of Portland Cement and 0.05 to 0.50 weight parts pozzolan powder derived from a group comprising fly ash, steel slag, silica fume, or calcined kaolin clay.

In various embodiments of the invention, the curing agent is present in the composition in an amount of about 5.0% to about 21.0% by weight, preferably about 7.0% to about 19.0% by weight, and more preferably about 8.0% to about 18.0% by weight.

The curing agent may be a substantially solvent free, or a water dilutable polyamine having a plurality of N—H linkages capable of reacting with the epoxy resin. The amine-based curing agent may be a polyoxyalkylene polyamine, arylene polyamine, cyclo-aliphatic polyamine, Mannich base, or a blend of two or more of these polyamines. An example of a solvent free amine curing agent used in an embodiment is a polyoxypropylene polyamine such as Huntsman JEFFAMINE D-400. Examples of commercially available water-based amine curing agents useful in the invention include, for example, Cognis WATERPOXY 751, UCB BECKOPOX 613, Huntsman ARADUR 39, Bakelite RUETADUR VE-51, and Air Products ANQUAMINE 287. Preferably, the curing agent is a water soluble polyamine, which acts as an epoxy resin emulsifier, such as Cognis WATERPOXY 751.

The coating compositions of the invention are prepared from a desired amount of epoxy resin such that the weight ratio of epoxy resin to hydraulic cement is in the range of about 0.1:1 to about 1.2:1; the compositions further provide a ratio of about 0.8 to 1.3 equivalents of total epoxy groups to 1.0 equivalent of reactive curing agent amine groups; and 0.2 to 0.9 parts water to 1.0 part hydraulic cement.

A non-reactive diluent may be added to decrease the viscosity of the mixture. Any diluent that does not react with the other elements of the composition and decreases viscosity may be used. In one embodiment, the non-reactive diluent is benzyl alcohol, which not only reduces viscosity, but also speeds the epoxy/amine reaction and helps prevent freezing or crystallization of the coating composition. In another embodiment, the non-reactive diluent is an aromatic hydrocarbon resin, such as Rutgers NOVARES LS 500 for example, which not only reduces viscosity, but also has lower volatility. The non-reactive diluent may be included in either or both components of the composition.

The composition may further include a reactive diluent. The reactive diluent may be an aliphatic, cycloaliphatic, or aromatic epoxy functional diluent. The reactive diluent may be either monofunctional or multifunctional. In one embodiment, the reactive diluent is a C6 to C18 alkyl mono glycidyl ether, and is included at a ratio of about 8 to 26 parts per 100 parts of epoxy resin. One example of a commercial reactive diluent suitable for this composition is Air Products EPODIL 748.

The composition may further include a silicone adhesion promoter to enhance the adhesion of the cured composition to the surface being coated. The silicone adhesion promoter is included in a ratio of about 0.5 to 2 parts to 100 parts of epoxy resin. In one embodiment, the organosilicon adhesion promoter is γ-glycidoxypropyl-trimethoxy silane.

The composition may further include a water-based latex resin in a ratio of up to about 1.2 parts water-based latex resin to 1.0 part of hydraulic cement. Examples of useful water-based latex resins include, acrylic, styrene-acrylic, styrene butadiene rubber (SBR), polyvinyl acetate (PVA), and ethylene vinyl acetate (EVA) latexes. In one embodiment, the latex resin is an acrylic, styrene-acrylic, or styrene butadiene rubber (SBR) latex. Examples include Rohm & Haas RHOPLEX MC-1834, SYNTHOMER 29Y46 SBR, and Resolution IC-780.

The composition may further include a desired amount of pigment up to about 24.0% in order to achieve the desired coating color. In one embodiment the pigment is titanium dioxide. The pigment may be dispersed in either component of the two-part composition of the invention.

The composition may further include up to about 8.0%, preferably about 1.0% to about 8.0%, by weight hollow spheres as an inert filler. In one embodiment the hollow spheres are hollow micro-spheres having a particle diameter in the range of about 5 to 90 microns and are included in the hydraulic cement containing component of the two-part composition in a ratio of about 1 part hollow spheres to about 3 to 50 parts of hydraulic cement. Examples include 3M SCOTCHLITE K37 Glass Bubbles and CHL A-90 Hollow Ceramic Microspheres.

The composition may further include up to about 0.4% of a cement plasticizer, such as a lignosulfonate salt, for example Lignotech Norlig 24C; up to about 0.55% of a defoamer, such as a non-silicone defoamer, for example BYK-Chemie BYK-011, and/or a silicone defoamer, for example Tego FOAMEX 805; and up to about 2.4% of a corrosion inhibitor, such as Cortec MCI-2000 or W. R. Grace DCI S; all as set forth in the following examples and claims.

Thus, in various embodiments, the composition of the present invention includes some or all of the following components: about 0.06% to about 0.40% by weight of a concrete plasticizer; about 0.15% to about 0.55% by weight of a defoamer; and, about 0.01% to about 2.4% by weight of a coffosion inhibitor.

One embodiment of the waterbome epoxy coating composition is divided into two parts for easy storage and transportation. Part A of this formula is non-aqueous and includes liquid Bisphenol A epoxy resin, reactive diluent, organosilicon adhesion promoter, hydraulic cement, and hollow spheres. Part B is aqueous and includes water-based amine curing agent, water-based latex resin, and defoamer. The two parts are combined in a sprayer to mix the two parts together and then apply the coating composition to a surface, wherein the composition has a weight ratio of epoxy resin to hydraulic cement in the range of about 0.19:1 to about 0.6:1; a ratio of about 0.9 to 1.15 equivalents of total epoxy groups to 1.0 equivalent of reactive curing agent amine groups; and 0.3 to 0.6 parts total water to 1.0 part hydraulic cement.

Another embodiment comprises a non-aqueous Part A including liquid Bisphenol A epoxy resin, reactive diluent, organosilicon adhesion promoter, hydraulic cement, and hollow spheres; and an aqueous Part B including a water-based amine curing agent, water-based latex resin, and defoamer. The two parts are combined in a sprayer to mix the two parts together and then apply the coating composition to a surface, wherein the final composition has a weight ratio of epoxy resin to hydraulic cement is in the range of about 0.25:1 to about 0.5:1; a ratio of about 0.95 to 1.1 equivalents of total epoxy groups to 1.0 equivalent of reactive curing agent amine groups; and 0.4 to 0.6 parts total water to 1.0 part hydraulic cement. Each part is approximately equal in volume and additional water may be added after the two parts are mixed.

Various embodiments of the non-aqueous Part A of the two part composition of the invention broadly comprise some or all of the following components: epoxy resin in an amount of about 10% to about 42% by weight, preferably about 15% to about 33% by weight, and more preferably about 18% to about 27% by weight of said Part A; hydraulic cement powder in an amount of about 46% to about 90% by weight, preferably about 57% to about 84% by weight, and more preferably about 58% to about 80% by weight of said Part A; hollow spheres in an amount of about 1% to about 13% by weight of said Part A; mono glycidyl ether as reactive diluent in an amount of about 1.1% to about 4.8% by weight of said Part A; and an organosilicon adhesion promoter in an amount of about 0.1% to about 0.5% by weight, preferably about 0.2% to about 0.4% by weight of said Part A. Various embodiments of the aqueous Part B of the two part composition of the invention broadly comprise some or all of the following components: at least one curing agent, comprising a water soluble polyamine, in an amount of about 30% to about 60% by weight, preferably about 34% to about 52% by weight of said Part B; concrete plasticizer in an amount of about 0.2% to about 0.6% by weight of said Part B; water-based latex resin in an amount of about 30% to about 50% by weight of said Part B; defoamer in an amount of about 0.5% to about 1.0% by weight of said Part B; and corrosion inhibitor in an amount of about 0.04% to about 18.5% by weight of said Part B. Further exemplary embodiments are set forth in the following examples.

In an alternative embodiment the non-aqueous Part A includes a solvent-free amine curing agent, hydraulic cement and hollow spheres. Part B is aqueous and includes a water-dispersed epoxy resin, and may further contain a water-based latex resin, and defoamer. The two parts are combined in a sprayer to mix the two parts together and then apply the coating composition to a surface, wherein the composition has a weight ratio of epoxy resin to hydraulic cement in the range of about 0.1:1 to about 1.2:1; a ratio of about 0.8 to 1.3 equivalents of total epoxy groups to 1.0 equivalent of reactive curing agent amine groups; and 0.2 to 0.9 parts total water to 1.0 part hydraulic cement.

The embodiments of the waterborne epoxy coating composition may be applied with a brush, roller, or airless sprayer to produce cured coatings with a thickness from about 78% to about 95% of the single coat wet thickness. Exemplary embodiments of the composition applied by airless sprayer produce cured coatings with a thickness from about 90% to about 95% of the single coat wet thickness. Said cured coatings have a thickness of from approximately 2 mils to approximately 15 mils, preferably having a thickness of approximately 4 mils to approximately 12 mils, and more preferably having a thickness of approximately 6 mils to approximately 10 mils. The embodiments of the composition exhibit gel times from about 60 minutes to about 120 minutes and are dry to touch in less than 24 hours.

The embodiments of the composition are more specifically shown in the following examples, wherein it can be seen that the embodiments of the composition are prepared without the use of a separate emulsifier surfactant to stabilize either part of the two part composition or the final blended composition. It is further apparent from the foregoing detailed description and the component ranges from the following examples of embodiments of the composition of the invention that the composition has low volatile organic compound content, as indicated by the non-reactive diluent (benzyl alcohol) content.

|  |  | Examples | | |
|---|---|---|---|---|
|  |  | 1 Weight % | 2 Weight % | 3 Weight % |
| Part A Components | | | | |
| Epoxy Resin | Huntsman GY6010 | 22.29 | 20.35 | 23.26 |
| Reactive Diluent | Air Products Epodil 748 | 2.50 | 2.29 | 2.61 |
| Adhesion Promoter | OSi Silquest A-187 | 0.25 | 0.23 | 0.26 |
| Portland Cement | Lehigh Type I | 59.43 | 0 | 0 |
|  | Lefarge Fondu Type V | 0 | 66.43 | 50.32 |
| Pozzolan | Lefarge NewChem Slag | 0 | 0 | 16.70 |
| Titanium Dioxide | Huntsman TR-60 | 9.60 | 0 | 0 |
| Hollow Spheres |  | 2.50 | 7.59 | 3.27 |
| Non-reactive Diluent | Benzyl Alcohol | 3.42 | 3.12 | 3.57 |
| Total Part A |  | 100.00 | 100.00 | 100.00 |
| Part B Components | | | | |
| Water-based amine curing agent | Cognis Waterpoxy 751 | 14.95 | 25.64 | 51.87 |
|  | Anquamine 287 | 35.33 | 10.85 | 0 |
| Titanium Dioxide | Huntsman TR-60 | 0 | 27.82 | 0 |
| Concrete Super Plasticizer | Lignotech Norlig 24C | 0.57 | 0 | 0 |
| Latex Emulsion | Synthomer 29Y46 SBR | 48.61 | 0 | 0 |
|  | Rohm & Haas Rhoplex MC-1834 | 0 | 35.28 | 0 |
| Non-reactive Diluent | Benzyl Alcohol | 0.55 | 0.40 | 0 |
| Deionized Water |  | 0 | 0 | 29.95 |
| Corrosion Inhibitor | W. R. Grace DCIS | 0 | 0 | 18.18 |
| Total Part B |  | 100.00 | 100.00 | 100.00 |

|  | Examples | | | | | |
|---|---|---|---|---|---|---|
|  | 4 Weight % | 5 Weight % | 6 Weight % | 7 Weight % | 8 Weight % | 9 Weight % | 10 Weight % |
| Part A Components | | | | | | | |
| Epoxy Resin: Huntsman GY6010 | 13.04 | 13.45 | 12.20 | 14.44 | 10.55 | 16.47 | 8.23 |
| Reactive Diluent: Air Products Epodil 748 | 1.46 | 1.51 | 1.37 | 1.62 | 1.19 | 1.85 | 0.92 |
| Adhesion Promoter: OSi Silquest A-187 | 0.15 | 0.15 | 0.14 | 0.16 | 0.12 | 0.19 | 0.09 |
| Portland Cement: Lefarge Secar 71 Type V | 35.82 | 37.44 | 38.90 | 34.12 | 43.08 | 26.68 | 42.67 |
| Pozzolan: Calcined Kaolin Imerys Metastar 450 | 7.18 | 3.74 | 7.78 | 2.73 | 10.77 | 1.33 | 21.34 |

-continued

| | | | | | | | |
|---|---|---|---|---|---|---|---|
| Hollow Spheres: 3M Scotchlite K37 | 2.34 | 2.42 | 2.19 | 2.60 | 1.90 | 2.96 | 1.48 |
| Non-reactive Diluent: Benzyl Alcohol | 2.00 | 2.07 | 1.87 | 2.22 | 1.62 | 2.53 | 1.26 |
| Sub-total | 61.99 | 60.78 | 64.45 | 57.90 57.89 | 69.23 | 52.01 | 75.99 |
| Part B Components | | | | | | | |
| Water-based amine curing agent: Cognis Waterpoxy 751 | 16.49 | 17.01 | 15.42 | 18.26 | 13.35 | 20.82 | 10.41 |
| Deionized Water | 4.74 | 4.90 | 4.44 | 5.26 | 3.84 | 5.99 | 3.00 |
| Latex Emulsion: Rohm & Haas Rhoplex MC-1834 | 16.27 | 16.78 | 15.22 | 18.02 | 13.17 | 20.54 | 10.27 |
| Non-reactive Diluent: Benzyl Alcohol | 0.18 | 0.19 | 0.17 | 0.20 | 0.15 | 0.23 | 0.12 |
| Defoamer: BYK-Chemie BYK-011 (non silicone) | 0.33 | 0.34 | 0.31 | 0.36 | 0.26 | 0.41 | 0.21 |
| Sub-total | 38.01 | 39.22 | 35.56 | 42.10 | 30.77 | 47.99 | 24.01 |

| | Examples | | | | | | |
|---|---|---|---|---|---|---|---|
| | 11 Weight % | 12 Weight % | 13 Weight % | 14 Weight % | 15 Weight % | 16 Weight % | 17 Weight % |
| Part A Components | | | | | | | |
| Epoxy Resin: Huntsman GY6010 | 11.48 | 13.16 | 11.74 | 12.82 | 10.43 | 14.86 | 8.53 |
| Reactive Diluent: Air Products Epodil 748 | 1.29 | 1.48 | 1.32 | 1.44 | 1.17 | 1.67 | 0.96 |
| Adhesion Promoter: OSi Silquest A-187 | 0.13 | 0.15 | 0.13 | 0.14 | 0.12 | 0.17 | 0.10 |
| Portland Cement: Lefarge Secar 71 Type V | 32.41 | 27.48 | 31.44 | 29.65 | 35.75 | 20.20 | 36.52 |
| Pozzolan: Fly Ash | 6.71 | 2.75 | 6.29 | 2.37 | 8.94 | 1.01 | 18.26 |
| Hollow Spheres: 3M Scotchlite K37 | 4.27 | 4.90 | 4.37 | 4.77 | 3.88 | 5.53 | 3.17 |
| Non-reactive Diluent: Benzyl Alcohol | 1.76 | 2.02 | 1.80 | 1.97 | 1.60 | 2.28 | 1.31 |
| Sub-total | 58.05 | 51.93 | 57.10 | 53.17 | 61.89 | 45.72 | 68.85 |
| Part B Components | | | | | | | |
| Water-based amine curing agent: Cognis Waterpoxy 751 | 14.52 | 16.64 | 14.85 | 16.21 | 13.19 | 18.79 | 10.78 |
| Deionized Water | 1.35 | 1.55 | 1.38 | 1.51 | 1.23 | 1.75 | 1.00 |
| Titanium Dioxide: Huntsman TR-60 | 11.3 | 12.95 | 11.55 | 12.61 | 10.26 | 14.62 | 8.39 |
| Latex Emulsion: Rohm & Haas Rhoplex MC-1834 | 14.33 | 16.42 | 14.65 | 16.00 | 13.02 | 18.54 | 10.64 |
| Non-reactive Diluent: Benzyl Alcohol | 0.16 | 0.19 | 0.17 | 0.18 | 0.15 | 0.21 | 0.12 |
| Defoamer: BYK-Chemie BYK-011 (non silicone) | 0.29 | 0.33 | 0.29 | 0.32 | 0.26 | 0.37 | 0.21 |
| Sub-total | 41.95 | 48.07 | 42.90 | 46.83 | 38.11 | 54.28 | 31.15 |

| | Examples | | | | | | |
|---|---|---|---|---|---|---|---|
| | 18 Weight % | 19 Weight % | 20 Weight % | 21 Weight % | 22 Weight % | 23 Weight % | 24 Weight % |
| Part A Components | | | | | | | |
| Epoxy Resin: Huntsman GY6010 | 13.20 | 13.85 | 12.62 | 14.81 | 10.99 | 16.76 | 8.73 |
| Reactive Diluent: Air Products Epodil 748 | 1.48 | 1.56 | 1.42 | 1.66 | 1.23 | 1.88 | 0.98 |
| Adhesion Promoter: OSi Silquest A-187 | 0.15 | 0.16 | 0.14 | 0.17 | 0.12 | 0.19 | 0.10 |
| Portland Cement: Lefarge Fondu Type V | 34.91 | 35.51 | 37.07 | 32.24 | 41.32 | 25.01 | 41.05 |
| Pozzolan: Lefarge NewChem Slag | 7.00 | 3.55 | 7.41 | 2.58 | 10.33 | 1.25 | 20.53 |
| Hollow Spheres: | 5.06 | 5.31 | 4.83 | 5.67 | 4.21 | 6.42 | 3.35 |

-continued

|  | | | | | | | |
|---|---|---|---|---|---|---|---|
| 3M Scotchlite K37 | | | | | | | |
| Non-reactive Diluent: | 2.03 | 2.13 | 1.94 | 2.27 | 1.69 | 2.57 | 1.34 |
| Benzyl Alcohol | | | | | | | |
| Sub-total | 63.83 | 62.05 | 65.43 | 59.41 | 69.89 | 54.08 | 76.07 |
| Part B Components | | | | | | | |
| Water-based amine curing agent: Cognis Waterpoxy 751 | 16.07 | 16.86 | 15.36 | 18.03 | 13.38 | 20.40 | 10.63 |
| Deionized Water | 3.83 | 4.02 | 3.66 | 4.30 | 3.19 | 4.86 | 2.53 |
| Latex Emulsion: Synthomer 29Y46 SBR | 15.77 | 16.55 | 15.08 | 17.70 | 13.13 | 20.02 | 10.43 |
| Non-reactive Diluent: Benzyl Alcohol | 0.18 | 0.19 | 0.17 | 0.20 | 0.15 | 0.23 | 0.12 |
| Defoamer: BYK-Chemie BYK-011 (non silicone) | 0.32 | 0.33 | 0.30 | 0.36 | 0.27 | 0.40 | 0.21 |
| Sub-total | 36.17 | 37.95 | 34.57 | 40.59 | 30.11 | 45.92 | 23.93 |

| | Examples | | | | | | |
|---|---|---|---|---|---|---|---|
| | 25 Weight % | 26 Weight % | 27 Weight % | 28 Weight % | 29 Weight % | 30 Weight % | 31 Weight % |
| Part A Components | | | | | | | |
| Epoxy Resin: Huntsman GY6010 | 11.81 | 13.16 | 12.16 | 13.92 | 10.80 | 15.40 | 8.82 |
| Reactive Diluent: Air Products Epodil 748 | 1.33 | 1.48 | 1.37 | 1.56 | 1.21 | 1.73 | 0.99 |
| Adhesion Promoter: OSi Silquest A-187 | 0.13 | 0.15 | 0.14 | 0.16 | 0.12 | 0.17 | 0.10 |
| Portland Cement: Lefarge Secar 71 White Type V (Calcium Aluminate) | 33.32 | 29.83 | 31.59 | 26.78 | 35.90 | 20.33 | 36.65 |
| Pozzolan: Silica Fume | 6.66 | 2.98 | 6.32 | 2.14 | 8.97 | 1.02 | 18.32 |
| Hollow Spheres: 3M Scotchlite K37 | 1.81 | 2.01 | 1.86 | 2.13 | 1.65 | 2.36 | 1.35 |
| Non-reactive Diluent: Benzyl Alcohol | 1.81 | 2.02 | 1.87 | 2.14 | 1.66 | 2.37 | 1.35 |
| Sub-total | 56.87 | 51.63 | 55.30 | 48.83 | 60.31 | 43.37 | 67.58 |
| Part B Components | | | | | | | |
| Water-based amine curing agent: Cognis Waterpoxy 751 | 14.93 | 17.07 | 15.77 | 18.05 | 14.00 | 19.98 | 11.44 |
| Deionized Water | 1.39 | 0.65 | 0.61 | 0.69 | 0.54 | 0.77 | 0.44 |
| Titanium Dioxide: Huntsman TR-60 | 11.62 | 13.28 | 12.27 | 14.05 | 10.90 | 15.55 | 8.90 |
| Latex Emulsion: Rohm & Haas Rhoplex MC-1834 | 14.73 | 16.84 | 15.56 | 17.81 | 13.82 | 19.72 | 11.29 |
| Non-reactive Diluent: Benzyl Alcohol | 0.17 | 0.19 | 0.18 | 0.20 | 0.16 | 0.22 | 0.13 |
| Defoamer: BYK-Chemie BYK-011 (non silicone) | 0.30 | 0.34 | 0.31 | 0.36 | 0.28 | 0.40 | 0.23 |
| Sub-total | 43.13 | 48.37 | 44.70 | 51.17 | 39.69 | 56.63 | 32.42 |

| | Examples | | | | | | |
|---|---|---|---|---|---|---|---|
| | 32 Weight % | 33 Weight % | 34 Weight % | 35 Weight % | 36 Weight % | 37 Weight % | 38 Weight % |
| Part A Components | | | | | | | |
| Epoxy Resin: Huntsman GY6010 | 13.23 | 13.65 | 12.37 | 14.66 | 10.70 | 16.72 | 8.43 |
| Reactive Diluent: Air Products Epodil 748 | 1.49 | 1.53 | 1.39 | 1.65 | 1.20 | 1.88 | 0.95 |
| Adhesion Promoter: OSi Silquest A-187 | 0.15 | 0.15 | 0.14 | 0.16 | 0.12 | 0.19 | 0.09 |
| Portland Cement: Federal Type I | 35.89 | 37.53 | 38.98 | 34.20 | 43.16 | 26.75 | 42.49 |
| Pozzolan: Calcined Kaolin Imerys Metastar 450 | 7.20 | 3.75 | 7.80 | 2.74 | 10.79 | 1.34 | 21.25 |
| Hollow Spheres: 3M Scotchlite K37 | 1.93 | 1.99 | 1.80 | 2.13 | 1.56 | 2.43 | 1.23 |

-continued

| | | | | | | | |
|---|---|---|---|---|---|---|---|
| Non-reactive Diluent: | 2.03 | 2.10 | 1.90 | 2.25 | 1.64 | 2.57 | 1.29 |
| Benzyl Alcohol | | | | | | | |
| Sub-total | 61.921 | 60.70 | 64.38 | 57.79 | 69.18 | 51.87 | 75.73 |
| Part B Components | | | | | | | |
| Water-based amine curing agent: Cognis Waterpoxy 751 | 16.52 | 17.05 | 15.45 | 18.31 | 13.37 | 20.88 | 10.53 |
| Deionized Water | 4.76 | 4.91 | 4.45 | 5.27 | 3.85 | 6.01 | 3.03 |
| Latex Emulsion: Rohm & Haas Rhoplex MC-1834 | 16.30 | 16.82 | 15.25 | 18.06 | 13.19 | 20.60 | 10.39 |
| Non-reactive Diluent: Benzyl Alcohol | 0.18 | 0.19 | 0.17 | 0.20 | 0.15 | 0.23 | 0.12 |
| Defoamer: BYK-Chemie BYK-011 (non silicone) | 0.33 | 0.34 | 0.31 | 0.36 | 0.27 | 0.41 | 0.21 |
| Sub-total | 38.09 | 39.30 | 35.62 | 42.21 | 30.82 | 48.13 | 24.27 |

| | Examples | | | | | | |
|---|---|---|---|---|---|---|---|
| | 39 Weight % | 40 Weight % | 41 Weight % | 42 Weight % | 43 Weight % | 44 Weight % | 45 Weight % |
| Part A Components | | | | | | | |
| Epoxy Resin: Huntsman GY6010 | 13.07 | 13.49 | 12.23 | 14.49 | 10.58 | 16.52 | 8.33 |
| Reactive Diluent: Air Products Epodil 748 | 1.47 | 1.52 | 1.37 | 1.63 | 1.19 | 1.86 | 0.94 |
| Adhesion Promoter: OSi Silquest A-187 | 0.15 | 0.15 | 0.14 | 0.16 | 0.12 | 0.19 | 0.09 |
| Portland Cement: Federal Type I | 35.91 | 37.55 | 39.00 | 34.23 | 43.18 | 26.77 | 42.51 |
| Pozzolan: Lefarge NewChem Slag | 7.20 | 3.75 | 7.80 | 2.74 | 10.79 | 1.34 | 21.25 |
| Hollow Spheres: 3M Scotchlite K37 | 2.08 | 2.14 | 1.94 | 2.30 | 1.68 | 2.63 | 1.32 |
| Non-reactive Diluent: Benzyl Alcohol | 2.01 | 2.07 | 1.88 | 2.22 | 1.62 | 2.54 | 1.28 |
| Sub-total | 61.89 | 60.68 | 64.36 | 57.77 | 69.16 | 51.83 | 75.72 |
| Part B Components | | | | | | | |
| Water-based amine curing agent: Cognis Waterpoxy 751 | 16.53 | 17.06 | 15.46 | 18.32 | 13.37 | 20.89 | 10.53 |
| Deionized Water | 4.76 | 4.91 | 4.45 | 5.27 | 3.85 | 6.01 | 3.03 |
| Latex Emulsion: Rohm & Haas Rhoplex MC-1834 | 16.31 | 16.83 | 15.25 | 18.07 | 13.20 | 20.61 | 10.39 |
| Non-reactive Diluent: Benzyl Alcohol | 0.18 | 0.19 | 0.17 | 0.20 | 0.15 | 0.23 | 0.12 |
| Defoamer: BYK-Chemie BYK-011 (non silicone) | 0.33 | 0.34 | 0.31 | 0.36 | 0.27 | 0.41 | 0.21 |
| Sub-total | 38.11 | 39.32 | 35.64 | 42.23 | 30.84 | 48.17 | 24.28 |

| | Examples | | | | | | |
|---|---|---|---|---|---|---|---|
| | 46 Weight % | 47 Weight % | 48 Weight % | 49 Weight % | 50 Weight % | 51 Weight % | 52 Weight % |
| Part A Components | | | | | | | |
| Epoxy Resin: Huntsman GY6010 | 13.11 | 13.53 | 12.26 | 14.53 | 10.60 | 16.58 | 8.34 |
| Reactive Diluent: Air Products Epodil 748 | 1.47 | 1.52 | 1.38 | 1.63 | 1.19 | 1.86 | 0.94 |
| Adhesion Promoter: OSi Silquest A-187 | 0.15 | 0.15 | 0.14 | 0.16 | 0.12 | 0.19 | 0.09 |
| Portland Cement: Federal Type I | 36.02 | 37.66 | 39.10 | 34.33 | 43.28 | 26.86 | 42.58 |
| Pozzolan: Silica Fume | 7.22 | 3.77 | 7.82 | 2.75 | 10.82 | 1.34 | 21.29 |
| Hollow Spheres: 3M Scotchlite K37 | 1.80 | 1.86 | 1.68 | 2.00 | 1.46 | 2.28 | 1.15 |
| Non-reactive Diluent: Benzyl Alcohol | 2.01 | 2.08 | 1.88 | 2.23 | 1.63 | 2.55 | 1.28 |
| Sub-total | 61.78 | 60.56 | 64.26 | 57.64 | 69.09 | 51.66 | 75.68 |

-continued

| Part B Components | | | | | | | |
|---|---|---|---|---|---|---|---|
| Water-based amine curing agent: Cognis Waterpoxy 751 | 16.58 | 17.11 | 15.50 | 18.38 | 13.41 | 20.97 | 10.55 |
| Deionized Water | 4.77 | 4.92 | 4.46 | 5.29 | 3.86 | 6.03 | 3.04 |
| Latex Emulsion: Rohm & Haas Rhoplex MC-1834 | 16.36 | 16.88 | 15.29 | 18.13 | 13.23 | 20.69 | 10.41 |
| Non-reactive Diluent: Benzyl Alcohol | 0.18 | 0.19 | 0.17 | 0.20 | 0.15 | 0.23 | 0.12 |
| Defoamer: BYK-Chemie BYK-011 (non silicone) | 0.33 | 0.34 | 0.31 | 0.36 | 0.27 | 0.42 | 0.21 |
| Sub-total | 38.22 | 39.44 | 35.74 | 42.36 | 30.91 | 48.34 | 24.32 |

|  | Examples | | | | | | |
|---|---|---|---|---|---|---|---|
|  | 53 Weight % | 54 Weight % | 55 Weight % | 56 Weight % | 57 Weight % | 58 Weight % | 59 Weight % |
| Part A Components | | | | | | | |
| Epoxy Resin: Huntsman GY6010 | 12.12 | 13.51 | 12.49 | 14.29 | 11.09 | 15.81 | 9.62 |
| Reactive Diluent: Air Products Epodil 748 | 1.36 | 1.52 | 1.40 | 1.61 | 1.25 | 1.73 | 1.08 |
| Adhesion Promoter: OSi Silquest A-187 | 0.14 | 0.15 | 0.14 | 0.16 | 0.12 | 0.18 | 0.11 |
| Portland Cement: Type I | 39.58 | 32.67 | 37.76 | 28.80 | 44.72 | 21.23 | 58.20 |
| Hollow Spheres: 3M Scotchlite K37 | 2.28 | 2.54 | 2.35 | 2.68 | 2.08 | 2.97 | 1.81 |
| Non-reactive Diluent: Benzyl Alcohol | 1.86 | 2.97 | 1.92 | 2.19 | 1.70 | 2.43 | 1.48 |
| Sub-total | 57.34 | 52.46 | 56.06 | 49.73 | 60.97 | 44.39 | 72.29 |
| Part B Components | | | | | | | |
| Water-based amine curing agent: Anquamine 287 | 4.63 | 5.16 | 4.77 | 5.45 | 4.23 | 6.03 | 3.01 |
| Water-based amine curing agent: Waterpoxy 751 | 10.93 | 12.18 | 11.26 | 12.89 | 10.00 | 14.26 | 7.10 |
| Titanium Dioxide: Huntsman TR-60 | 11.86 | 13.22 | 12.22 | 13.98 | 10.85 | 15.47 | 7.71 |
| Latex Emulsion: Synthomer 29Y46 SBR | 15.05 | 16.77 | 15.50 | 17.73 | 13.77 | 19.61 | 9.77 |
| Non-reactive Diluent: Benzyl Alcohol | 0.17 | 0.19 | 0.18 | 0.20 | 0.16 | 0.22 | 0.11 |
| Corrosion Inhibitor: Cortec MCI-2000 | 0.02 | 0.02 | 0.02 | 0.02 | 0.02 | 0.02 | 0.01 |
| Sub-total | 42.66 | 47.54 | 43.94 | 50.27 | 39.03 | 55.61 | 27.71 |

Further embodiments of the composition are described by the following untested examples. The following examples are provide by way of illustration not limitation, and the changes reflected are equally applicable to each of the compositions specifically described in Examples 1 through 59.

|  |  | Untested Examples | | | | |
|---|---|---|---|---|---|---|
|  |  | 60 Weight % | 61 Weight % | 62 Weight % | 63 Weight % | 64 Weight % |
| Part A Components | | | | | | |
| Epoxy Resin | Huntsman GY6010 | 14.31 | 13.04 | 13.04 | 11.48 | 12.12 |
| Reactive Diluent | Air Products Epodil 748 | 1.61 | 1.46 | 1.46 | 1.29 | 1.36 |
| Adhesion Promoter | OSi Silquest A-187 | 0.16 | 0.15 | 0.15 | 0.13 | 0.14 |
| Portland Cement | Type I | 38.15 | 0 | 0 | 0 | 39.58 |
|  | Type V | 0 | 35.82 | 35.82 | 32.41 | 0 |
| Pozzolan | Calcined Kaolin | 0 | 7.18 | 7.18 | 0 | 0 |
|  | Fly Ash | 0 | 0 | 0 | 6.71 | 0 |

-continued

| | | | | | | |
|---|---|---|---|---|---|---|
| Titanium Dioxide | Huntsman TR-60 | 6.16 | 0 | 0 | 0 | 0 |
| Hollow Spheres | | 1.61 | 2.34 | 2.34 | 4.27 | 2.28 |
| Non-reactive Diluent | Rutgers Novares LS 500 | 2.20 | 2.00 | 2.00 | 1.76 | 1.86 |
| Sub-total | | 64.19 | 61.99 | 61.99 | 58.06 | 57.34 |
| Part B Components | | | | | | |
| Water-based amine curing agent | Cognis Waterpoxy 751 | 5.35 | 16.49 | 16.49 | 14.52 | 10.93 |
| | Anquamine 287 | 12.65 | 0 | 0 | 0 | 4.63 |
| Deionized Water | | 0 | 4.74 | 4.74 | 1.35 | 0 |
| Titanium Dioxide | Huntsman TR-60 | 0 | 0 | 0 | 11.30 | 11.86 |
| Concrete Super Plasticizer | Lignotech Norlig 24C | 0.20 | 0 | 0 | 0 | 0 |
| Latex Emulsion | Synthomer 29Y46 SBR | 17.41 | 0 | 0 | 0 | 15.05 |
| | Rohm & Haas Rhoplex MC-1834 | 0 | 16.27 | 16.27 | 14.33 | 0 |
| Non-reactive Diluent | Benzyl Alcohol | 0 | 0.18 | 0 | 0 | 0 |
| | Rutgers Novares LS 500 | 0.2 | 0 | 0.18 | 0.16 | 0.17 |
| Defoamer | BYK-Chemie BYK-011 (non-silicone) | 0 | 0 | 0.16 | 0 | 0 |
| | Tego Foamex 805 (silicone) | 0 | 0.33 | 0.17 | 0.29 | 0 |
| Corrosion Inhibitor | Cortec MCI-2000 | 0 | 0 | 0 | 0 | 0.02 |
| Sub-total | | 35.81 | 38.01 | 38.01 | 41.94 | 42.66 |

| | | Untested Examples 65 Weight % |
|---|---|---|
| Part A Components | | |
| Liquid Amine Resin | Huntsman Jeffamine D-400 | 14.45 |
| Portland Cement | Lehigh Type I | 42.01 |
| Hollow Spheres | Scotchlite K-37 Glass Bubbles | 2.41 |
| Sub-total | | 58.86 |
| Part B Components | | |
| Water-dispersed Epoxy Resin | Resolution Epi-Rez 3510-W-60 | 41.14 |
| Sub-total | | 41.14 |

Thus, in various embodiments, the composition of the present invention broadly comprises some or all of the following components: an epoxy resin of, in one embodiment, between 8.0% to 23.0% by weight, and, in another embodiment, between 10% to 42% by weight; a powdered hydraulic cement of, in one embodiment, between 20.0% to 72.0% by weight and, in another embodiment, between 46% to 90% by weight; water in an amount at least sufficient to react with the cement; a curing agent of, in one embodiment, between 5.0% to 21.0% by weight, and, in another embodiment, between 30% to 60%; a non-reactive diluent of between 0.1% to 3.3% by weight; a reactive diluent of, in one embodiment, between 0.8% to 2.6% by weight, and, in another embodiment, between 1.1% to 4.8% by weight; a pigment of between 6.0% to 24.0% by weight; an organosilicon adhesion promoter of, in one embodiment, between 0.08% to 0.26% by weight, and, in another embodiment, between 0.1% to 0.5%; a water-based latex resin of between 4.0% to 31.0% by weight; a plurality of hollow spheres of, in one embodiment, between 1.0% to 8.0% by weight, and, in another embodiment, between 1% to 13% by weight; a defoamer of between 0.5% to 1.0% by weight; a non-silicon defoamer of between 0.15% to 0.55% by weight; a silicone defoamer of between 0.15% to 0.55% by weight; a corrosion inhibitor of, in one embodiment, between 0.01% to 2.4% by weight, and, in another embodiment, of between 0.04% to 18.5% by weight; a concrete plasticizer of between 0.2% to 0.6% by weight; and/or a latex resin of between 30% to 50% by weight. Characterized another way, one embodiment of the composition of the present invention broadly comprises approximately 90 parts epoxy resin mixed with approximately 10 parts reactive diluent to produce a mixture, and approximately 1 part hydraulic cement powder mixed with approximately 0.11 to 1.5 parts of the aforementioned mixture, to ultimately produce the coating composition having between 0.80 to 1.30 equivalents of total epoxy groups to 1.00 equivalent of reactive amine groups. In various embodiments, the composition forms a coat having a thickness of approximately between 2 mils to 15 mils.

Any of the disclosed embodiments of the claimed composition may be used in a process to protectively coat a surface. The process involves preparing the composition according to the present invention, mixing the two parts with an appropriate amount of water, and applying the coating to the surface. The formula may be applied with a brush, roller or airless sprayer and will achieve a high build film in a single application, although multiple coats may be applied at the discretion of the user.

Thus, a waterborne epoxy composition is disclosed which utilizes hydraulic cement powder as an element of the epoxy composition to provide a desired initial application coat thickness with good fluidity and enhanced cure time while still providing protection against corrosion and other environmental threats. The coating composition also provides corrosion resistance equal to organic solvent based and solvent free coatings.

While preferred embodiments and particular applications of this invention have been shown and described, it is apparent to those skilled in the art that many other modifications and applications of this invention are possible, including using the teaching to develop coating compositions having three or more components, without departing from the inventive concepts herein. It is, therefore, to be understood that, within the scope of the appended claims, this invention may be practiced otherwise than as specifically described, and the invention is not to be restricted except in the spirit of the appended claims. Though some of the features of the invention may be claimed in dependency, each feature has merit if used independently.

What is claimed is:

1. A two-component emulsion composition for use in coating surfaces, the emulsion composition comprising:
    (a) a first component including:
        (i) 10% to 42% by weight of an epoxy resin; and
        (ii) 46% to 90% by weight of hydraulic cement powder; and
    (b) a second component including:
        (i) 30% to 60% by weight of a curing agent comprising a water soluble polyamine, which acts as an epoxy resin emulsifier; and
        (ii) water in an amount at least sufficient to react with the hydraulic cement; and
    (c) the first component and second component being mixed to provide the emulsion coating composition, wherein the coating composition forms coatings in a single coat having a thickness of from approximately 2 mils to approximately 15 mils.

2. The composition according to claim 1, wherein the epoxy resin is a liquid epoxy resin.

3. The composition according to claim 2, wherein the liquid epoxy resin is a liquid bisphenol A epoxy resin.

4. The composition according to claim 1, wherein the epoxy resin is present in an amount of 15% to 33% by weight of the first component, and said epoxy resin is a liquid epoxy resin.

5. The composition according to claim 1, wherein the epoxy resin is present in an amount of 18% to 27% by weight of the first component, and said epoxy resin is a liquid epoxy resin.

6. The composition according to claim 1, wherein the hydraulic cement powder is Portland Cement.

7. The composition according to claim 6, wherein the Portland Cement is Type I Portland cement.

8. The composition according to claim 6, wherein the Portland cement is White Type I Portland cement.

9. The composition according to claim 6, wherein the Portland cement is Type V Portland cement.

10. The composition according to claim 1, wherein the hydraulic cement powder is present in an amount of 57% to 84% by weight of the first component, and said hydraulic cement powder is Portland Cement.

11. The composition according to claim 1, wherein the hydraulic cement powder is present in an amount of 58% to 80% by weight of the first component, and said hydraulic cement powder is Portland Cement.

12. The composition according to claim 1, wherein the hydraulic cement powder is a mixture of 0.50 to 0.95 weight parts of Portland Cement and 0.05 to 0.50 weight parts pozzolan powder derived from a group comprising fly ash, steel slag, silica fume, or calcined kaolin clay.

13. The composition according to claim 1, wherein the curing agent is present in an amount of 34% to 52% by weight of the second component.

14. The composition according to claim 1, wherein the first component and second component are mixed in a ratio to provide a coating composition having 0.80 to 1.30 equivalents of total epoxy groups to 1.00 equivalent of N—H linkages capable of reacting with the epoxy groups.

15. The composition according to claim 1, wherein the composition further includes 0.1% to 3.3% by weight of a non-reactive diluent based on the total composition.

16. The composition according to claim 15, wherein the non-reactive diluent is benzyl alcohol.

17. The composition according to claim 15, wherein the non-reactive diluent is an aromatic hydrocarbon resin.

18. The composition according to claim 1, wherein the first component further includes 1.1% to 4.8% by weight of a reactive diluent comprising a mono glycidyl ether.

19. The composition according to claim 18, wherein the mono glycidyl ether is a C-6 to C-18 alkyl glycidyl ether.

20. The composition according to claim 18, wherein the aliphatic glycidyl ether is a C-12 to C-14 alkyl glycidyl ether.

21. The composition according to claim 1, wherein the composition further includes 6% to 24% by weight of a pigment based on the total composition.

22. The composition according to claim 21, wherein the pigment is included in the first component of the composition.

23. The composition according to claim 21, wherein the pigment is included in the second component of the composition.

24. The composition according to claim 21, wherein the pigment is titanium dioxide.

25. The composition according to claim 1, wherein the first component further includes 0.1% to 0.5% by weight of an organosilicon adhesion promoter.

26. The composition according to claim 1, wherein the first component further includes 0.2% to 0.4% by weight of an organosilicon adhesion promoter.

27. The composition according to claim 26, wherein the organosilicon adhesion promoter is γ-glycidoxypropyl-trimethoxy silane.

28. The composition according to claim 1, wherein the second component further includes 0.2% to 0.6% by weight of a concrete plasticizer.

29. The composition according to claim 1, wherein the second component further includes 30% to 50% by weight of a water-based latex resin.

30. The composition according to claim 29, wherein the water-based latex resin is a styrene-acrylic latex.

31. The composition according to claim 29, wherein the water-based latex resin is a styrene butadiene rubber latex.

32. The composition according to claim 29, wherein the water-based latex resin is an acrylic latex.

33. The composition according to claim 1, wherein the first component further includes 1% to 13% by weight of hollow spheres.

34. The composition according to claim 33, wherein the hollow spheres are hollow ceramic micro-spheres.

35. The composition according to claim 33, wherein the hollow spheres are hollow glass micro-spheres.

36. The composition according to claim 1, wherein the second component further includes 0.5% to 1.0% by weight of a defoamer.

37. The composition according to claim 36, wherein the defoamer is a non-silicone defoamer.

38. The composition according to claim 36, wherein the defoamer is a silicone defoamer.

39. The composition according to claim 36, wherein the defoamer is a blend of silicone and non-silicone defoamers.

40. The composition according to claim 1, wherein the second component further includes 0.04% to 18.5% by weight of a corrosion inhibitor.

41. The composition according to claim 1, wherein the composition forms coatings in a single coat having a thickness of from approximately 4 mils to approximately 12 mils.

42. The composition according to claim 1, wherein the composition forms coatings in a single coat having a thickness of from approximately 6 mils to approximately 10 mils.

43. A process for protecting a surface with a single coat of an emulsion coating composition, the process comprising the steps of:

(a) preparing a first composition component comprising:
  (i) 10% to 42% by weight of an epoxy resin; and
  (ii) 46% to 90% by weight of hydraulic cement powder;
(b) preparing a second composition component comprising:
  (i) 30% to 60% by weight of a curing agent comprising a water soluble polyamine, which acts as an epoxy resin emulsifier; and
  (ii) water in an amount at least sufficient to react with the hydraulic cement;
(c) mixing the first component and second component to provide an emulsion coating composition;
(d) applying a single coat of the emulsion coating composition to a substrate; and
(e) curing the single coat of the emulsion coating composition, yielding a single coat thickness of from approximately 2 mils to approximately 15 mils.

* * * * *